F. VANDOREN.
Grain Drill.
No. 8,879.
Patented Apr. 13, 1852.
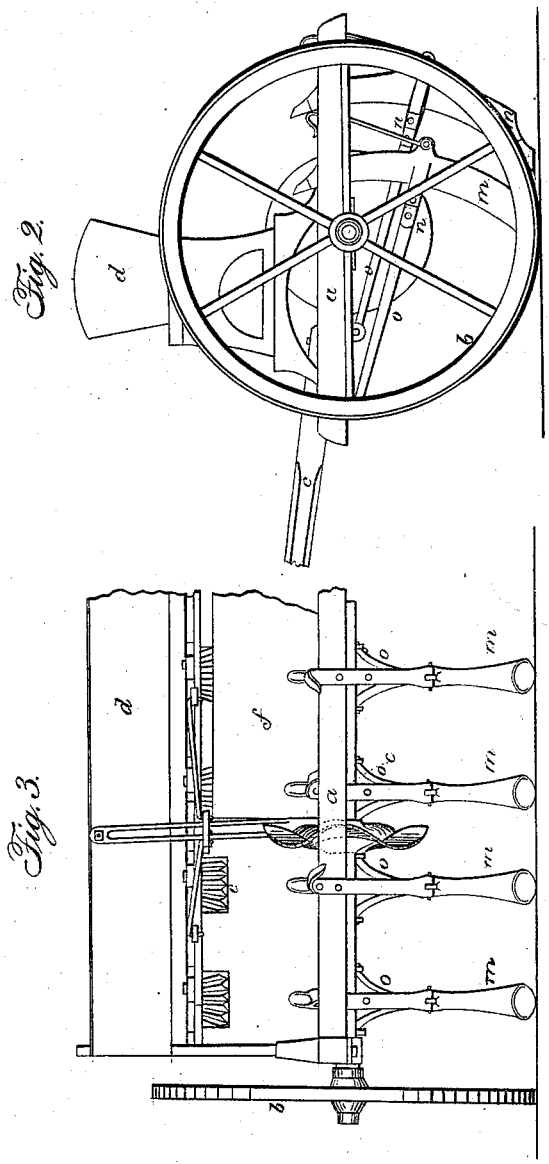
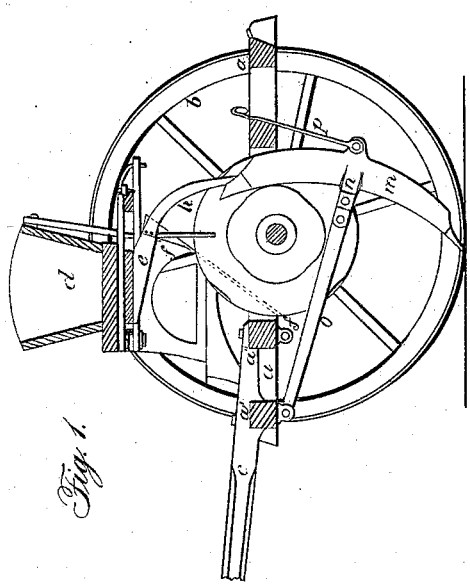

UNITED STATES PATENT OFFICE.

FRANCIS VANDOREN, OF ADRIAN, MICHIGAN.

IMPROVEMENT IN SEED-PLANTERS.

Specification forming part of Letters Patent No. 8,879, dated April 13, 1852.

*To all whom it may concern:*

Be it known that I, FRANCIS VANDOREN, of Adrian, in the county of Lenawee and State of Michigan, have invented a new and useful Improvement in Combined Seed-Drill and Cultivator; and I do hereby declare that the following is a full, clear, and exact description of the principle or character which distinguishes it from all other things before known, and of the usual manner of making, modifying, and using the same.

My improvements are made in the teeth of the drill and cultivator, and in the manner of distributing seed broadcast by a slight change in the seed-drilling apparatus.

The construction is as follows: A suitable frame, $a$, is mounted on two wheels, $b$, with a pole or tongue, $c$, like ordinary cultivators. The axle turns with the wheels, and on its center or at some other convenient point it bears a side cam or zigzag that causes the slides of the seed-box $d$ to vibrate. The seed-box is similar to others in common use, and under each aperture through the bottom of the hopper there is a fan-shaped shoe, $e$, with grooves in its bottom expanding outward, so as to spread the grain that falls into them and more evenly distribute it when sowing broadcast, in which operation I employ an inclined apron, $f$, below the ends of the shoes to receive the seed therefrom and deliver it the ground below. In drilling I dispense with this apron $f$ and apply pliable tubes $h$ to the ends of the shoes to convey the seeds to the hollow tooth, similar to other drills now in use. The teeth $m$ of the drill, which are also cultivator-teeth, are in form somewhat resembling a cornucopia, or gradually tapering from one end to the other. They are hollow, gradually tapering from end to end, and curved. On either end there is a steel point on the concave side, (that being forward when the tooth is used in the machine.) Both ends are properly scarfed off from said point for the purpose intended. There is a projection, $n$, perpendicularly from the center of the concave part of the tooth, to which the draw-bar $o$ is affixed, which is jointed to the frame $a$ forward of the axle. There are two front bars to the frame, $a'$ $a''$. The teeth, in drilling, are all attached to the front bar, and are in line with the small end of the tooth downward, and the flexible tubes $h$ are placed within their broad end. The teeth are suspended at their proper elevation to the frame above by a strap, $p$, of leather or metal, which is attached on the convex side to the center, where an eye is formed for the purpose, as is clearly shown in Fig. 1.

When the apparatus is to be used as a cultivator the seed-box, &c., is of course dispensed with, and the teeth are turned over, as shown in Fig. 2, bringing the large ends downward, and every other one of the teeth can be brought back to the second bar, as shown in Fig. 3.

Having thus fully described my improved seeding apparatus and cultivator, what I claim therein as new, and desire to secure by Letters Patent, is—

The hollow reversing tooth, constructed in the manner and for the purpose set forth.

FRANCIS VANDOREN.

Witnesses:
 BECKWITH WEST,
 T. C. DONN.